US006417958B1

(12) United States Patent
Du et al.

(10) Patent No.: US 6,417,958 B1
(45) Date of Patent: Jul. 9, 2002

(54) WDM OPTICAL COMMUNICATION SYSTEM USING CO-PROPAGATING RAMAN AMPLIFICATION

(75) Inventors: Mei Du, Scotch Plains; Torben N. Nielsen, Monmouth Beach; Karsten Rottwitt, Basking Ridge; Andrew John Stentz, Clinton, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 16 days.

(21) Appl. No.: 09/768,689

(22) Filed: Jan. 24, 2001

(51) Int. Cl.[7] .................................................. H01S 3/00
(52) U.S. Cl. ....................................................... 359/334
(58) Field of Search ................................ 359/334; 372/3

(56) References Cited

U.S. PATENT DOCUMENTS

| | | | | |
|---|---|---|---|---|
| 4,699,452 | A | 10/1987 | Mollenauer et al. | 359/334 |
| 4,881,790 | A | 11/1989 | Mollenauer | 350/96.15 |
| 5,673,280 | A | 9/1997 | Grubb et al. | 372/3 |
| 5,742,416 | A | 4/1998 | Mizrahi | 359/134 |
| 6,101,024 | A | 8/2000 | Islam et al. | 359/334 |
| 6,181,464 | B1 * | 1/2001 | Kidorf et al. | 359/134 |
| 6,342,966 | B1 * | 1/2002 | Button et al. | 359/143 |
| 2001/0028757 | A1 * | 10/2001 | Lee et al. | 385/24 |

OTHER PUBLICATIONS

Mark L. Dakss, Paul Melman, "Two–channel Fibre Raman amplification for wavelength division multiplexed systems", IEEE Proceedings, vol. 135, Pt. J, No. 2, Apr. 1988.

Shingo Kawai, Hiroji Masuda, Ken–Ichi Suzuki, Kazuo Aida, "Wide–Bandwidth and Long Distance WDM Transmission Using Highly Gain–Flattened Hybrid Amplifier" IEEE Photonics Technology Letters, vol. 11, No. 7, Jul. 1999.

Hiroji Masuda and Shingo Kawai, "Ultra Wide–Band Raman Amplification with a total Gain–Bandwidth of 132 nm of two Gain–Bands around 1.5 $\mu$m" ECOC '99, Sep. 26–30, 1999, Nice, France.

H. F. Mahlien, "Crosstalk due to stimulated Raman scattering in single–mode fibres for optical communication in wavelength division multiplex systems" Optical and Quantum Electronics, 16 (1984) 409–423, 1984 Chapman and Hall Ltd.

Weijian Jiang and Peida Ye, "Crosstalk in Fiber Raman Amplification for WDM Systems", Journal of Lightwave Technology, vol. 7, No. 9, Sep. 1989.

Takashi Nakashima, Shigeyuki Seikai, and Masataka Nakazawa, "Configuration of the optical Transmission Line Using Stimulated Raman Scattering for Signal Light Amplification" Journal of Lightwave Technology, vol. Lt.–4, No. 6, Jun. 1986.

Yasuhiro Aoki, "Fibre Raman amplifier properties for applications to long–distance optical communications" Optical and Quantum Electronics 21 (1989) S89–S104, 1989 Chapman and Hall Ltd.

(List continued on next page.)

Primary Examiner—Thomas H. Tarcza
Assistant Examiner—Deandra M. Hughes
(74) Attorney, Agent, or Firm—Wendy W. Koba, Esq.

(57) ABSTRACT

The use of a co-propagating fiber Raman amplifier in an optical WDM transmission system has been found to be practical in the situation where the fiber amplifier is operated into depletion and the characteristics of the input signals are controlled to exhibit a reduced integrated relative intensity noise (RIN) over the fiber crosstalk bandwidth. In particular, the reduction in the integrated RIN can be achieved by increasing the number of input channels (by adding more messages or simply using dummy channels), encoding the data in a particular fashion to reduce the integrated RIN, or decorrelating the plurality of N input signals below a predetermined, relatively low frequency (for example, 2 MHz).

30 Claims, 8 Drawing Sheets

OTHER PUBLICATIONS

S.A.E. Lewis, S.V. Chernikov and J.R. Taylor, "Gain Saturation in Silica–fibre Raman amplifier" Electronics Letters, 27th. May 1999, vol. 35, No. 11, pp. 923–924.

Yasuhiro Aoki, "Properties of Fiber Raman Amplifiers and their Applicability to Digital Optical Communication Systems" Journal of Lightwave Technology, vol. 6, No. 7, Jul. 1988.

Fabrizio Forghieri, Robert W. Tkach, Andrew R. Chraplyvy, "Bandwidth of Cross talk in Raman Amplifiers" OFC 1994 Technical Digest.

Fludger et al. Pump to Signal RIN Transfer in Raman Fibre Amplifiers. Electronics Letters, Jan. 4, 2001, vol. 37, No. 1, pp. 15–17.*

Wey et al. Crosstalk Bandwidth in Backward Pumped Fiber Raman Amplifiers. IEEE Photonics Technology Letters, vol. 11, No. 11, Nov. 1999. pp. 1417–1419.*

* cited by examiner $I(t) = \Sigma\ I_i(t)$

WDM OPTICAL COMMUNICATION SYSTEM USING CO-PROPAGATING RAMAN AMPLIFICATION

TECHNICAL FIELD

The present invention relates to the utilization of a co-propagating Raman amplifier in an optical communication system and, more particularly, to the utilization of a co-propagating Raman amplifier in a wavelength-division-multiplexed (WDM) optical communication system.

BACKGROUND OF THE INVENTION

Raman amplifiers have played an important role in advancing optical communication systems, primarily as a result of being capable of both increasing the capacity of such systems (in terms of higher data rate and more channels) and the transmission distance of the systems. Currently, most Raman amplifiers use a counter-pumped configuration in which the pump and message signals propagate in opposite directions through the fiber amplifier. To date, there have been limited applications of a "co-pumped" Raman amplifier where the pump and message signals propagate in the same direction through the fiber amplifier. The co-pumped architecture has been avoided due to the (presumed) increased presence of noise in the co-pumped amplifier, where noise is defined as "pump-signal crosstalk" (i.e., the noise originating from the pump being coupled to the message signals through Raman gain) and "signal-pump-signal crosstalk" (i.e., the encoded signal(s) impressing information to the same or different signal wavelength via the Raman process). The issue of pump-signal crosstalk has been addressed by the applicants in their co-pending application Ser. No. 60/186,797, filed Mar. 3, 2000. The ability to reduce pump-signal crosstalk using the methods disclosed in the co-pending application has lead to the ability to analyze and overcome the problems associated with signal-pump-signal crosstalk.

In general, Raman amplification is an extremely fast process, where the amplitude modulation of the encoded signal channels over a limited bandwidth is impressed upon the Raman pump. Thus, in this environment, even a perfectly "quiet" pump (i.e., a pump without noise) will become noisy during Raman amplification. This noise on the pump may then be impressed upon other message signals through the process of Raman amplification. For the purposes of understanding the teaching of the present invention, this effect will be defined as "signal-pump-signal" crosstalk (hereinafter referred to as "SPS crosstalk), since the crosstalk between the signal channels is mediated by the pump. See, for example, the article entitled "Cross talk in Fiber Raman Amplification for WDM Systems", by W. Jiang et al., appearing in the *Journal of Lightwave Technology*, Vol. 7, No. 9, 1989 at app. 1407–1411. In this theoretical paper, the crosstalk between two channels in a Raman amplifier was calculated. The crosstalk, even in the linear amplifier range (i.e., pump non-depletion), was shown to be severe for the co-propagating configuration. In its conclusion, the Jiang et al. reference stated that a counter-propagating arrangement would be preferred, since as the pump travels against the message signal, a stronger averaging effect exists, reducing the crosstalk.

It is also known in the art that SPS crosstalk depends on the modulation frequency of the channels, due to the relative propagation speed difference (i.e., group velocities) between the pump and message signals, as well as between the signals themselves. Such relative propagation speed difference introduces the walk-off of information in time, therefore effectively averaging the SPS crosstalk for higher frequencies. Such an effect results in a limited crosstalk bandwidth over which the SPS crosstalk may occur, which is much smaller as compared to the electrical bandwidth of the data. The crosstalk bandwidth in the counter-propagating configuration is known to be relatively small when compared to that encountered in the co-propagating configuration. See, for example, an article entitled "Bandwidth of cross talk in Raman amplifiers" by F. Forghieri et al. appearing in the OFC '94 Technical Digest at page 294. In this paper, the crosstalk bandwidth was defined as the frequency bandwidth in which the modulation depth onto the second continuous-wave signal channel is more than −20 dB. In this definition, the crosstalk bandwidth is determined by the fiber dispersion parameters at the wavelengths of the pump and signals, as well as the amount of Raman gain and pump depletion. In their study, the crosstalk bandwidth was determined to be approximately 100 MHz for a co-pumped Raman amplifier, as compared to only a 10 kHz bandwidth for a counter-pumped arrangement. Therefore, the Forghieri et al. paper concludes that the performance of an intensity modulated WDM system using a co-pumped Raman amplifier was severely limited by SPS crosstalk, noting as preferable, then, the counter-propagating configuration. A similar conclusion was made in the article "Crosstalk due to stimulated Raman scattering in single-mode fibers for optical communication in wavelength division multiplex systems" by H. F. Mahlein appearing in *Optical and Quantum Electronics* 16, (1984), p. 409 et seq.

It is well-known by those skilled in the art that the term "relative intensity noise" (RIN) is often used to characterize fluctuations in photocurrents. RIN is defined in terms of detected electrical power as the power-spectral density of the photocurrent in a 1—Hz bandwidth at a specified frequency divided by the average power of the photocurrent. Although the term "RIN" indicates that this quantity is usually used to characterize fluctuations arising from noise, the same quantity can be used to characterize fluctuations due to signal modulation, as is the case here.

As mentioned above, SPS crosstalk depends on both pump depletion and Raman gain. It is known by those skilled in the art that the amount of Raman gain is known as the "on/off" gain, and defined as ratio of output signal power in the presence of the Raman pump to the output signal power in the absence of the Raman pump. If a Raman pump amplifies an optical signal to an optical power comparable to the power of the Raman pump, the Raman pump will experience "pump depletion". This means that the power of the pump, at some position within the amplifier, will become significantly less than it would be in the absence of the signal, and that the "net" Raman amplification will be reduced. In practice, pump depletion is measured at the output of the amplifier and is defined as the intensity difference of the pump output "with" and "without" signal channels. In general, the smaller the pump depletion and Raman gain, the smaller the SPS crosstalk. Therefore, it is expected from the prior art studies that co-pumped Raman amplifiers are limited to applications with small levels of Raman gain and pump depletion. See, for example, the article entitled "Wide-Bandwidth and Long-Distance WDM Transmission using Highly Gain-Flattened Hybrid Amplifier" by S. Kawai et al., appearing in *IEEE Photonics Technology Letters*, Vol. 11, No. 7, Jul. 1999. In this article, 4 dB of Raman gain in a co-propagating-pump geometry was used in a discrete Raman amplifier as a part of the gain-flattened hybrid amplifier.

The prior art is replete with references describing the SPS crosstalk problem present in fiber Raman amplifiers and the utilization of a counter-propagating amplifier configuration to overcome this problem. The Jiang et al. article referenced above describes a solution involving limiting the signal gain and the injected pump power to values well below the threshold for Raman amplification. The Forghieri et al. and Mahlein articles suggest a solution in terms of eliminating all components within the crosstalk bandwidth (for example, 100 MHz), which is not practical in WDM applications. Several papers have stated that a counter-propagating configuration eliminates SPS crosstalk through averaging. For example, see an article by S. A. E. Lewis et al. appearing in *Electronic Letters*, Vol. 35, No. 11, 1999, at page 923. To date, therefore, most Raman amplifiers have been limited to the counter-propagating configuration.

However, as WDM optical communication systems continue to grow in capacity and reach longer distances, more system benefits could be realized from co-propagating Raman amplification. For example, a co-propagating Raman amplifier would allow for bidirectional pumping of a Raman amplifier, as well as bi-directional transmission of the message signals. Also, the aggregate signal powers have reached magnitudes that can easily deplete a Raman pump.

Thus, a need remains in the art for an arrangement capable of providing significant co-propagating Raman amplification in a WDM optical transmission system.

SUMMARY OF THE INVENTION

The need remaining in the prior art is addressed by the present invention, which relates to the utilization of a co-propagating Raman amplifier in optical communication system and, more particularly, to the utilization of a co-propagating Raman amplifier exhibiting reduced signal-pump-signal (SPS) crosstalk in a wavelength-division-multiplexed (WDM) optical communication system.

In accordance with the present invention, it has been discovered that co-propagating Raman amplification, when utilized into the pump depletion region, can be used in virtually any WDM optical transmission system, as long as the signal channels interacting with any given Raman pump exhibit small integrated RIN values over the fiber crosstalk bandwidth. In particular, it can be shown that SPS crosstalk in co-propagating fiber Raman amplifiers can be significantly reduced by altering the properties of the input signals so as to minimize the integrated RIN values of the signal channels over the fiber crosstalk bandwidth.

In accordance with the present invention, one or more of the following methods is used to provide the desired reduction of the integrated RIN values of the signal channels interacting with any given co-propagating Raman pump in the fiber crosstalk bandwidth: (1) transmission of a sufficient number of independent channels (using "dummy" channels, if necessary); (2) encoding the data such that any given signal channel has a small ratio of integrated RIN values over the fiber crosstalk bandwidth to that over the entire signal electrical bandwidth; and/or (3) decorrelating a plurality of input signals to reduce the integrated RIN values over the fiber crosstalk bandwidth. In general, the purpose of the present invention is to reduce the integrated RIN values over the fiber crosstalk bandwidth so as to essentially eliminate problems associated with SPS crosstalk in a co-propagating Raman amplifier.

In a preferred embodiment of the present invention, all three of these concepts would be used to provide for the greatest reduction in SPS crosstalk. However, it has been found that the implementation of even one of these features is sufficient to provide for a viable commercial WDM system using a co-propagating fiber Raman amplifier.

Various and further features and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
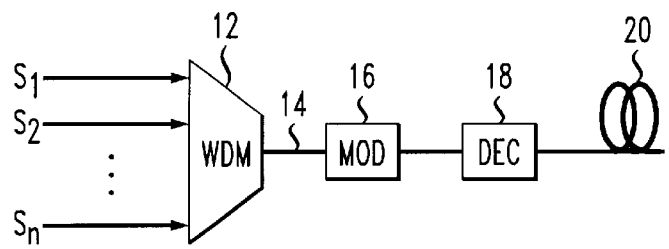
FIG. 1 contains a block diagram of an exemplary (simplified) prior art WDM system in a typical test bed setting.

FIG. 1 contains a simplified block diagram of a typical WDM transmission arrangement 10 that is used to analyze Raman amplified systems in a test bed environment. In particular, a number of separate channels, denoted $S_1$–$S_N$ are applied as separate inputs to a wavelength division multiplexer (WDM) 12 and combined onto a single transmission path 14. The combined output then passes through a modulator 16 and a decorrelator 18, where decorrelator 18 is used to "walk-off" the data bits in time between channels. In most cases, decorrelator 18 comprises a section of dispersion compensated fiber (DCF), or fiber delay lines. The output of decorrelator 18 then enters a transmission fiber 20, as shown in FIG. 1.

Figure 2:
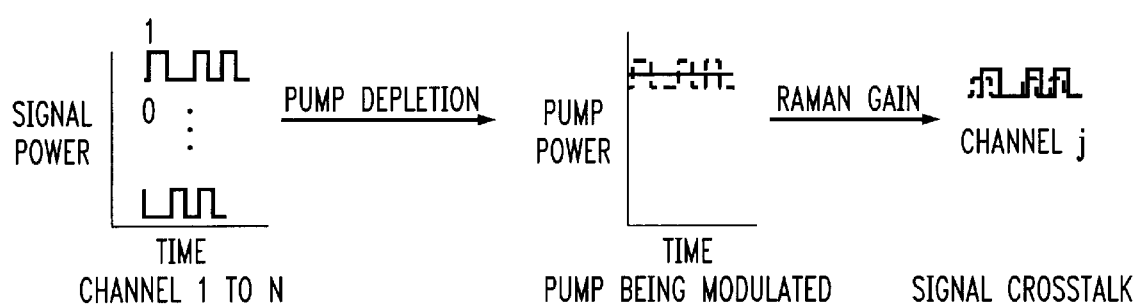
FIG. 2 illustrates a simplified model for understanding the generation of SPS crosstalk in a WDM system using Raman amplification.

FIG. 2 is a simplified illustration that is useful in understanding the parameters determining SPS crosstalk in a WDM optical transmission system. A plurality of message signals $M_1$–$M_N$ are shown in FIG. 2, where exemplary data patterns are depicted for channels 1 and N. As shown, the modulation of the input signals is impressed upon a continuous-wave pump through pump depletion. This noise is then impressed upon all of the various signals that are likewise passing through the same Raman amplifier. The presence of this noise is illustrated in FIG. 2, which shows a noise from channel i (shown with the dashed line) as impressed on the signal in channel j. As will be discussed below, an aspect of the present invention is to consider that as the number of signal channels increases, the probability that a symbol "1" is simultaneously transmitted on all N channels decreases. Indeed, for the purposes of the present invention, it is important to consider the statistics as based on N channels, not limited to experimental set-ups involving only two channels. Indeed, it is the collective modulation of the N signal channels that serves as the noise source for SPS crosstalk. This noise source, as discussed above, can be represented by the RIN value of the N signal channels.

Figure 3:
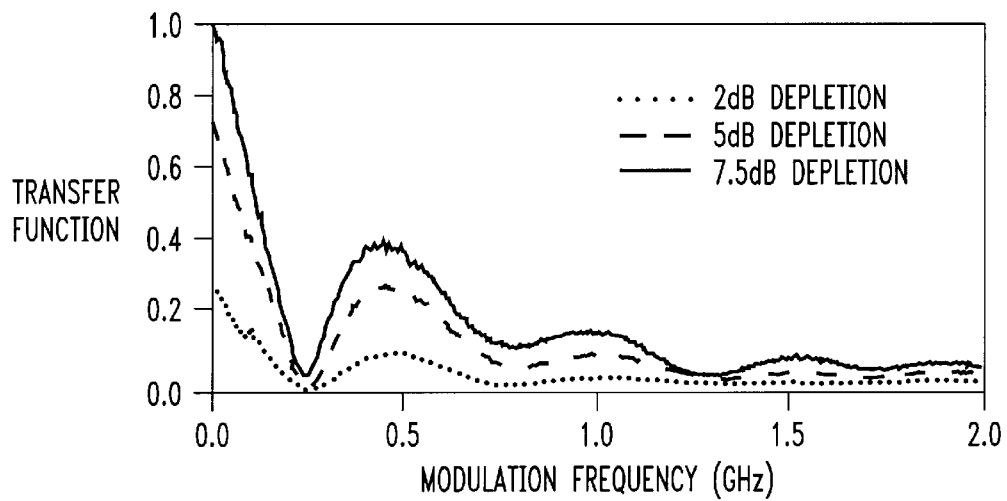
FIG. 3 is a plot that illustrates fiber crosstalk bandwidth for three different exemplary amounts of pump depletion.

FIG. 3 depicts the results of an exemplary measurement of the fiber crosstalk bandwidth as discussed above. Although "crosstalk bandwidth" has been numerically simulated (as, for example, by F. Forghieri et al.), there are no experimental measurements in the literature to date. The difficulty in measuring crosstalk bandwidths arises from the inability to separate out other noise sources during this measurement, in particular, the noise created by pump-signal crosstalk in co-propagating Raman amplifiers. Our co-pending application Ser. No. 60/186,777 describes an arrangement where the pump is optimized to significantly reduce the pump-signal crosstalk, thereby permitting for the purposes of the present invention, the ability to measure the fiber crosstalk bandwidth. In this example, a "noisy" signal and "quiet" pump were used at the input of a co-propagating Raman amplifier. The pump output was characterized with an RF spectrum analyzer to determine the frequency-dependence of the noise transferred from the signal through the pump depletion. This measurement yields the signal-to-pump crosstalk bandwidth, which is similar to the pump-to-signal crosstalk bandwidth. As an approximation, therefore, the measurement can be used to ascertain the frequency range that is critical for SPS crosstalk.

A transfer function can be used to characterize the frequency dependence of the SPS crosstalk. In particular, FIG. 3 illustrates the transfer function, which represents the ratio of the noise added to the pump by Raman amplification normalized to the signal noise at the input. The plots illustrate the transfer function for the noise from the signal to the pump, where a transfer function value of "1" represents a 100% transfer from signal noise to the pump at frequency ω. In particular, FIG. 3 illustrates the plot of the transfer function as a function of frequency for three different amounts of pump depletion through the Raman process in a particular transmission fiber exhibiting a group delay of approximately 0.2 ns/km between the pump and signal. As shown, the transfer efficiency of the noise from the signal to the pump decreases as the frequency increases. Therefore, at the low frequency, more efficient noise transfer occurs. Also, at the same frequency, larger depletion results in more efficient noise transfer. The envelope of the transfer function decreases as 1/f and the nulls appear at the frequency for which the propagation time difference between the pump and signal is an odd integer of the signal modulation frequency.

The "noise" source for SPS crosstalk originates from the collective modulation of the N channels that interact with the depleted Raman pump. This collective modulation can be characterized by the frequency-dependent RIN value of the N channels. An important quantity that affects the level of SPS crosstalk in co-propagating Raman amplifiers, as discussed above, is the integral of the product of this RIN value produced by the N signal channels interacting with a given Raman pump and the crosstalk transfer function over all the frequencies. For the purposes of understanding the teaching of the present invention, this quantity will hereinafter be referred to as the "integrated RIN", or IRIN.

Inspect of the transfer function in FIG. 3 reveals that the greatest contribution to the IRIN comes from the integration of the signal RIN values at frequencies less than the second null in the transfer function. Therefore, the IRIN value can be accurately approximated by simply integrating the signal RIN values over frequencies less than the second null in the transfer function. Thus, for the purposes of the present invention, the "crosstalk bandwidth" will be defined as the frequency range below the second null. For the example depicted in FIG. 3, therefore, the crosstalk bandwidth is approximately 750 MHz.

As previously discussed, the crosstalk bandwidth also depends on the fiber dispersion parameters at the pump and signal wavelengths. The crosstalk bandwidth can therefore be estimated with the following simplified equation:

$$\omega = 3\pi/[L_e (1/v_p - 1/v_s)],$$

where $v_p$ is defined as the group velocity at the pump wavelength, $v_s$ is the group velocity at the signal wavelength, and $L_e$ is the "effective length" of the amplifier.

Based on the above, therefore, it is concluded in accordance with the present invention that SPS crosstalk is determined by the following parameters: (1) the statistics of the N signal channels; (2) pump depletion (which determines the magnitude of modulation transfer from the message signals to the pump); (3) the Raman gain (which determines the magnitude of the modulation transfer from the pump back to the signals; and (4) the fiber crosstalk bandwidth in which most of the SPS crosstalk occurs. More particularly, the integrated RIN over the crosstalk bandwidth is a critical factor in overcoming SPS crosstalk problems in a co-propagating Raman amplifier.

In many applications, the signal channels are completely independent. Under these circumstances, the IRIN decreases as the number of channels increases. More particularly, as N approaches infinity, the IRIN will approach zero. When N=1, the IRIN is at its maximum. Therefore, one means of reducing the effects of SPS crosstalk in accordance with the present invention is to transmit a sufficient number of statistically independent channels through the Raman amplifier. If a "sufficient" number of data-bearing channels are not present, independent "dummy" channels may be added to reduce the SPS crosstalk. In either of these circumstances, the IRIN of the collection of channels should be substantially less than the IRIN of one channel.

In accordance with the present invention, another method of reducing the IRIN is to encode each channel such that it has reduced RIN values at frequencies less than the crosstalk bandwidth. In other words, each signal is encoded so as to substantially reduce the magnitude of its frequency components at frequencies less than the crosstalk bandwidth. Under these circumstances, the RIN values of a given channel, integrated over frequencies less than the crosstalk bandwidth and normalized by the crosstalk bandwidth, should be substantially less than the RIN values of the same channel integrated over frequencies less than the data bandwidth and normalized by the data bandwidth. Furthermore, if the signal channels are less than completely independent, a decorrelator may be used to substantially decorrelate the channels at frequencies less than the crosstalk bandwidth such that the IRIN of the channels is reduced before the signals are injected into the Raman amplifier.

Figure 4:
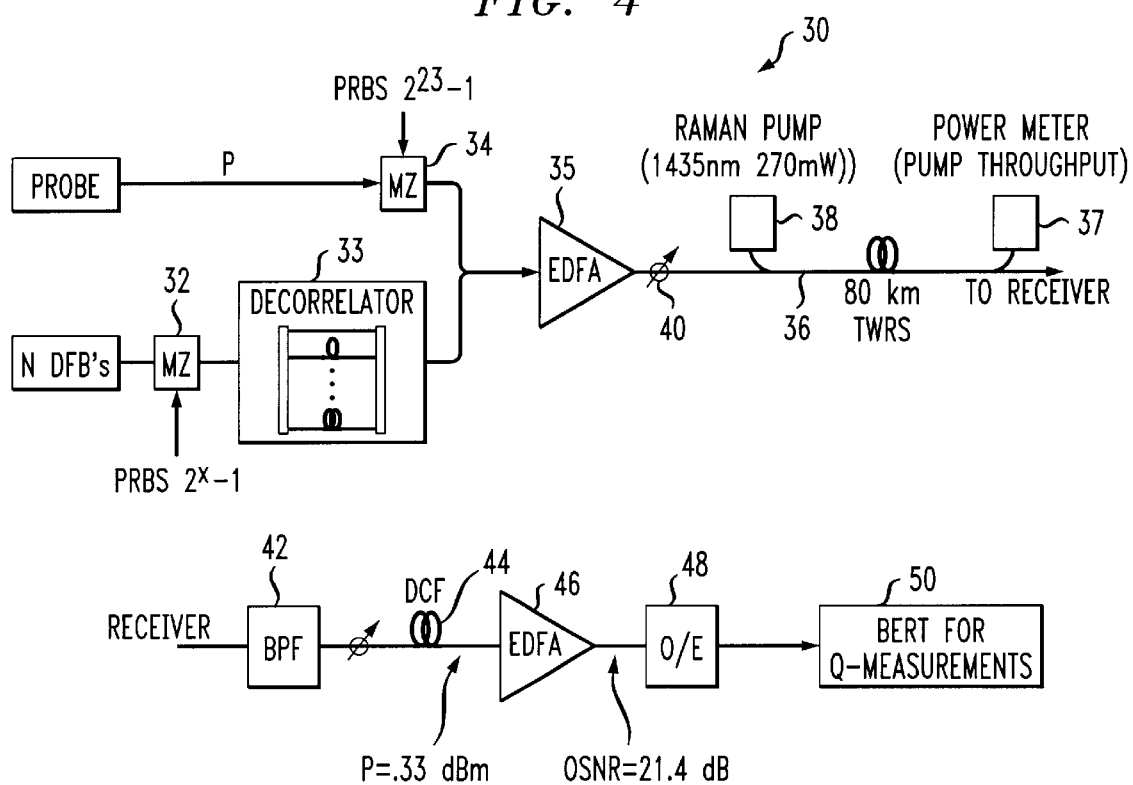
FIG. 4 is a diagram of an exemplary experimental setup used to evaluate SPS crosstalk in a fiber Raman amplifier using a co-propagating configuration.

FIG. 4 illustrates an experimental setup 30 that can be used to evaluate SPS crosstalk in accordance with the principles of the present invention. As will be discussed in detail below, problems with this setup in the past have resulted in incorrect conclusions regarding the workability of co-propagating fiber Raman amplifiers. Referring to FIG. 4, a total of N channels (for example, 100 GHz spaced WDM channels) are used to deplete a co-propagating Raman pump. The depleting tones are modulated in a Mach-Zehnder modulator 32 at a frequency of 9.95 Gb/s, using a $2^x-1$ pseudo-random bit stream (PRBS) sequence, with x=7, 9 or 31. The bit patterns of the N depleting tones are made statistically independent (i.e., decorrelated) by time-shifting their bit patterns relative to each other, for example by using a pair of AWGR's connected with fiber delay lines having different lengths for the N individual wavelengths. A probe signal P is also modulated at 9.95 Gb/s, in a second Mach-Zehnder modulator 34, using a $2^{23}1$ PRBS sequence. The two PRBS sequences are generated from individual pattern generators having independent clocks. The modulated probe signal is then combined with the statistically independent depleting tones, passed through an erbium-doped preamplifier 35 and launched into a fiber span 36 consisting of 80 km of fiber. Fiber span 36 is co-pumped with light from a semiconductor Raman pump source 38. In an exemplary experimental setup, the Raman pump power launched into fiber span 36 may be 270 mW, with the pump wavelength centered at 1435 nm, providing a peak Raman gain of approximately 13 dB in the 1525–1545 nm window. By adjusting the launch power of the N depleting tones (along with the probe signal) with an attenuator 40, the amount of Raman pump depletion can be varied between zero (with low launch power) and 15 dB. The pump depletion is measured by monitoring the pump throughput at the end of fiber span 36 with a power meter 37. Careful choice of the probe signal wavelength and power will minimize the amount of cross-phase modulation between the depleting tones and the probe channel. The large number of depleting tones ensures that the launch power per tone is sufficiently low so as to avoid SBS in the transmission fiber. At the receiver, probe signal P is selected with a bandpass filter 42 and a section of dispersion compensating fiber (DCF) 44 is used to compensate for the dispersion accumulated through the 80 km of transmission fiber. By adjusting the input level to an erbium-doped preamplifier 46, it can be ensured that the OSNR at the output of preamplifier 46 is fixed at 21.4 dB, with 0.1 nm resolution bandwidth, for any level of Raman pump depletion. The output is then passed through an optical receiving element 48 (such as a PIN photodiode) to convert the received optical signal into an electrical equivalent. The penalties caused by SPS crosstalk between the depleting tones and the probe are then quantified by the "Q" of the probe channel by measuring the bit error rate (BER) versus receiver decision level threshold, in an error measurement arrangement 50.

It is to be noted that experiments involving transmission systems are often conducted using multiple channels that are modulated by a common modulator, followed by a decorrelator, simply because this equipment set is substantially less expensive than a set of completely independent channels, each with its own modulator. However, the level of decorrelation at frequencies less than the crosstalk bandwidth is typically not sufficient to accurately characterize SPS crosstalk. With this system as it is now understood in accordance with the present invention, there are at least three cases where the SPS crosstalk measurements using the arrangement of FIG. 4 may lead to incorrect conclusions on the usefulness of co-propagating Raman amplifier configurations. Each of these three cases will be discussed in detail below.

Figure 5:
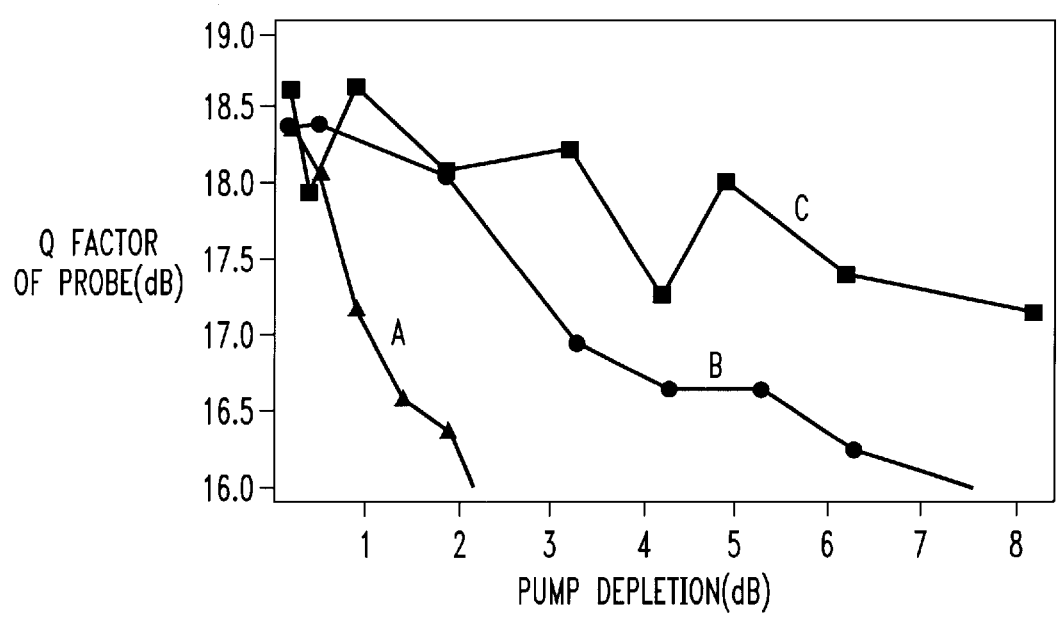
FIG. 5 is a plot of the Q factor as a function of Raman pump depletion for three different levels of data correlation.

FIG. 5 is a plot of the Q factor, as defined above, as a function of Raman pump depletion for the arrangement of FIG. 4, where 16 channels between 1542 nm and 1555 nm were chosen for use as depletion tones with a $2^{31}-1$ PRBS pattern and a 1534 nm signal (with a $2^{23}-1$ PRBS sequence used as a probe). Peak gain for the undepleted Raman amplifier was determined to be 12.5 dB. Curve A in FIG. 5 is associated with the channels when a decorrelator 52 is not present in the system. As shown, a sever Q factor penalty will result without decorrelation. For example, at a pump depletion level of 1.5 dB, a Q factor penalty of 1.6 dB was observed. Curve B illustrates an application where the decorrelator only effectively decorrelates the bits above 100 MHz in frequency. At the same 1.5 dB Q factor penalty, the amplifier can tolerate over 6 dB of pump depletion. In both situations, when measured in a counter-pumped Raman amplifier configuration at the same signal average power, no Q penalty was observed up to 8 dB pump depletion. Thus, it is concluded that the observed Q penalty can be attributed to SPS crosstalk. Based on these measurements, therefore, the prior art studies determined that the SPS crosstalk was severe for co-pumped amplification.

Figure 6:
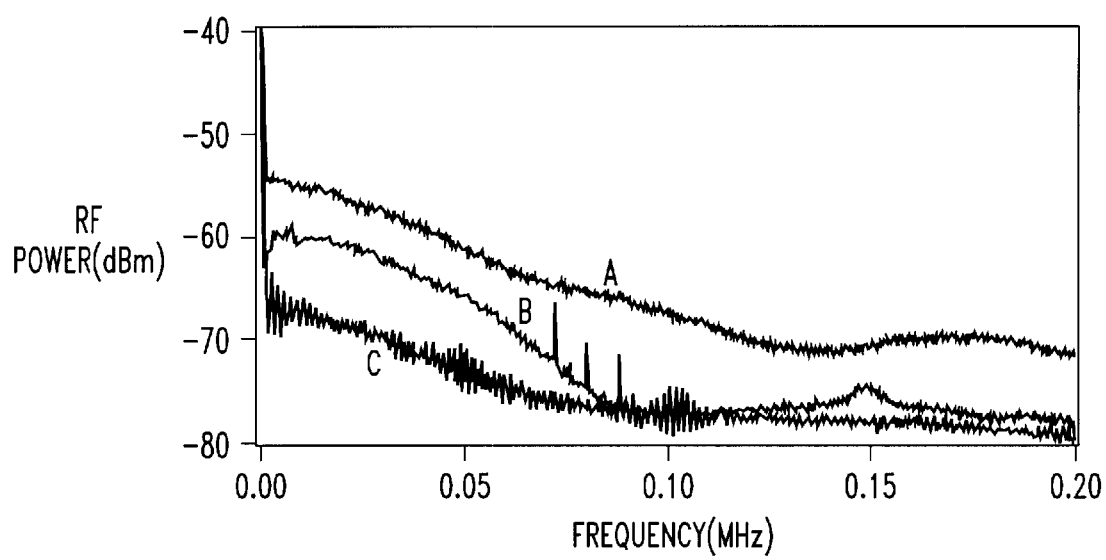
FIG. 6 is a graph of RF power density as a function of frequency for the same three levels of data correlation as used with the plot of FIG. 5.

As mentioned above, SPS crosstalk is a "pump mediated" crosstalk. The origin of this crosstalk is the collective signal modulation, which is coupled to the Raman pump through the pump depletion process. The integrated RIN of the combined signals can be used as a measure of such collective modulation. More particularly, the greater the integrated RIN, the greater the noise sources for SPS crosstalk. Using the same average power of the 16 channels, the RF power densities can be used to represent RIN. FIG. 6 illustrates the RF power densities of the pump throughput at 5 dB depletion for the three different data correlations discussed above in association with FIG. 5, where the same curve letterings are used for each. In FIG. 6, curve A represents the greatest RF power within the crosstalk bandwidth. In this case, 16 channels have the greatest correlation, where the only decorrelation of the channels comes from the dispersion walk-off within the transmission fiber. Curve B has less RF power within the fiber crosstalk bandwidth than curve A, where in this case the 16 channels pass through a decorrelator, but only the bits above 100 MHz are decorrelated.

In accordance with the present invention, it has been determined that the penalties shown in curves A and B are overestimated, as a result of test bed limitations. Curve C illustrates the situation where a special decorrelator capable of randomizing the message signal inputs above 2 MHz is used. As shown, curve C has the least RF power within the fiber crosstalk bandwidth. Referring back to FIG. 5, this same configuration yields a small Q penalty for up to 8 dB of pump depletion. Therefore, it is shown that a co-propagating fiber Raman amplifier is practical for use in a WDM transmission system operated into the pump depletion region (i.e., operated into the saturation region of the Raman amplifier), as long as the signal channels exhibit significant decorrelation within the fiber crosstalk bandwidth.

Figure 7:
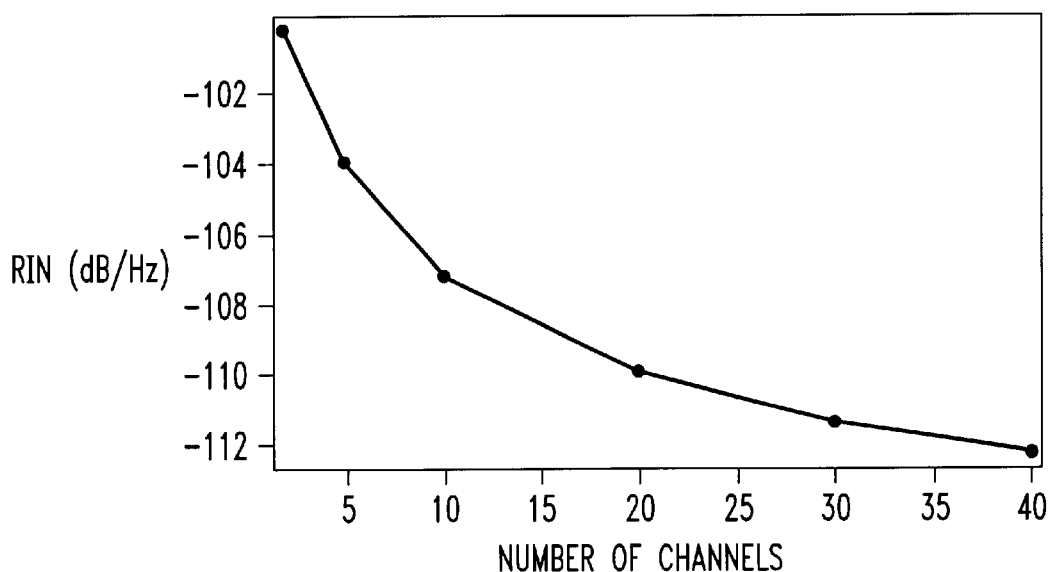
FIG. 7 is a graph of the relative intensity noise (RIN) value as a function of the number of signal channels in a fiber Raman amplifier.

As mentioned above, many prior art studies focused on the situation where two signal channels were used to determine the effects of crosstalk in Raman amplifiers. It has now been determined that this is a "worst case" scenario for studying SPS crosstalk. FIG. 7 is a graph of the RfN value of signal channels at 50 MHz as a function of the number, N, of signal channels that are included in the system (in an environment where the channels are decorrelated down to the 2 MHz level discussed above). As shown, and as further determined in accordance with the present invention, as the number of channels increases, the RIN value decreases. As the RIN value decreases, the integrated RIN value over the crosstalk bandwidth decreases. Therefore, the SPS crosstalk will decrease as well.

Figure 8:
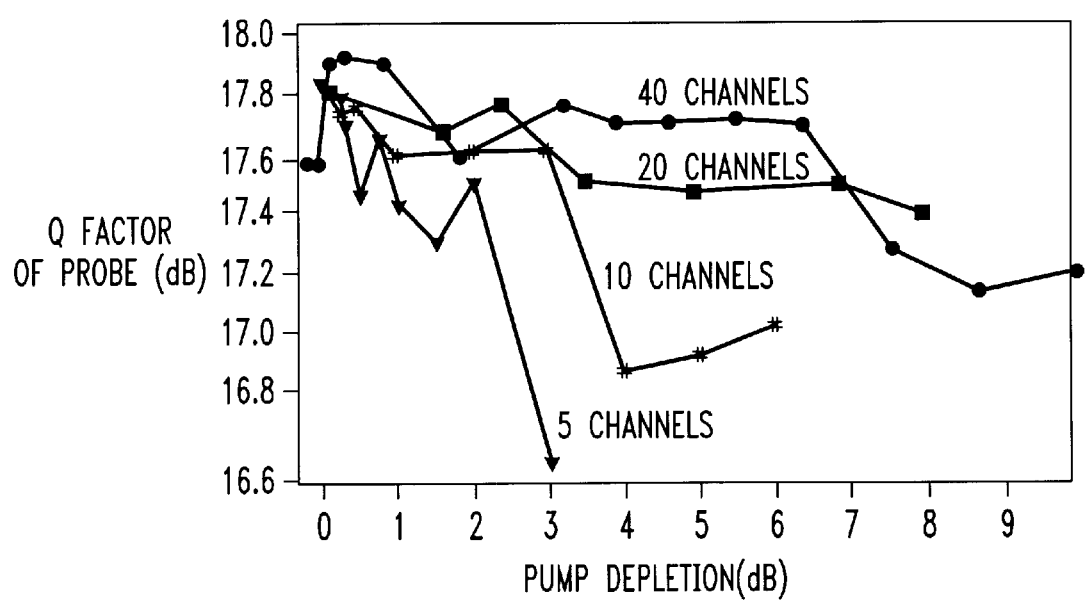
FIG. 8 contains a graph of the probe Q factor as a function of pump depletion for systems utilizing different numbers of information channels.

FIG. 8 contains a graph illustrating the Q factor of the probe as a function of pump depletion for a set of WDM optical transmission systems, each utilizing a different number of input channels (e.g., 5 channels, 10 channels, 20 channels and 40 channels). Peak gain for the undepleted Raman amplifier is about 12.5 dB. At the same total input signal power (that is, same pump depletion), a significant improvement in system performance is observed as the number of channels increases. These results again indicate that the reduction of RIN can reduce the SPS crosstalk penalty. In accordance with the present invention, therefore, the number of channels serves to average out the collective modulation of the signals and thus reduces the SPS crosstalk present in any one channel. In systems which by their nature have a limited number of channels, a set of "dummy channels" may be added, in accordance with the teachings of the present invention, to reduce the integrated RIN value.

Figure 9:
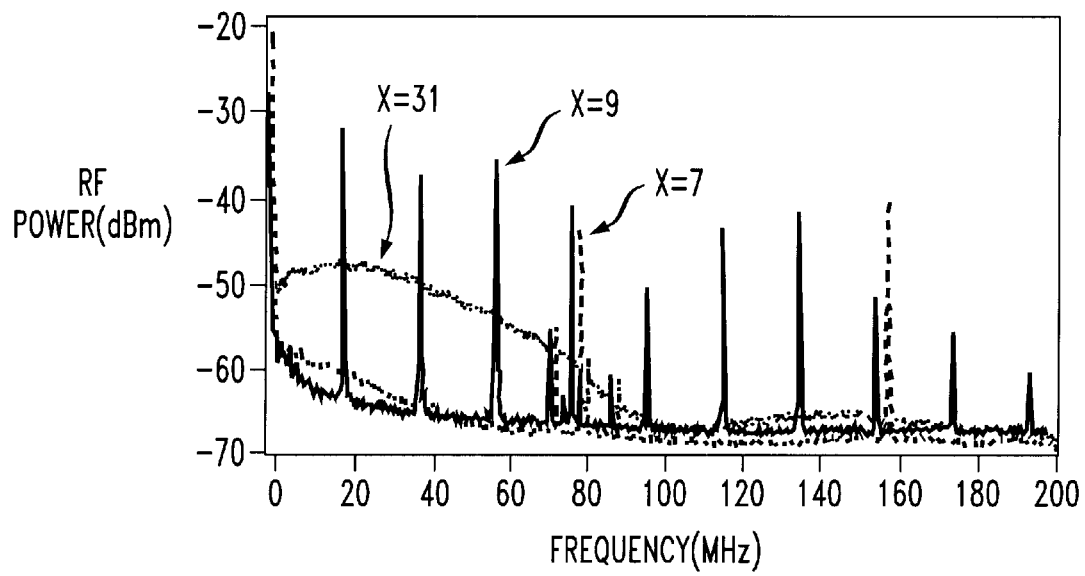
FIG. 9 is a graph of RF power density as a function of different data pattern lengths.
Figure 10:
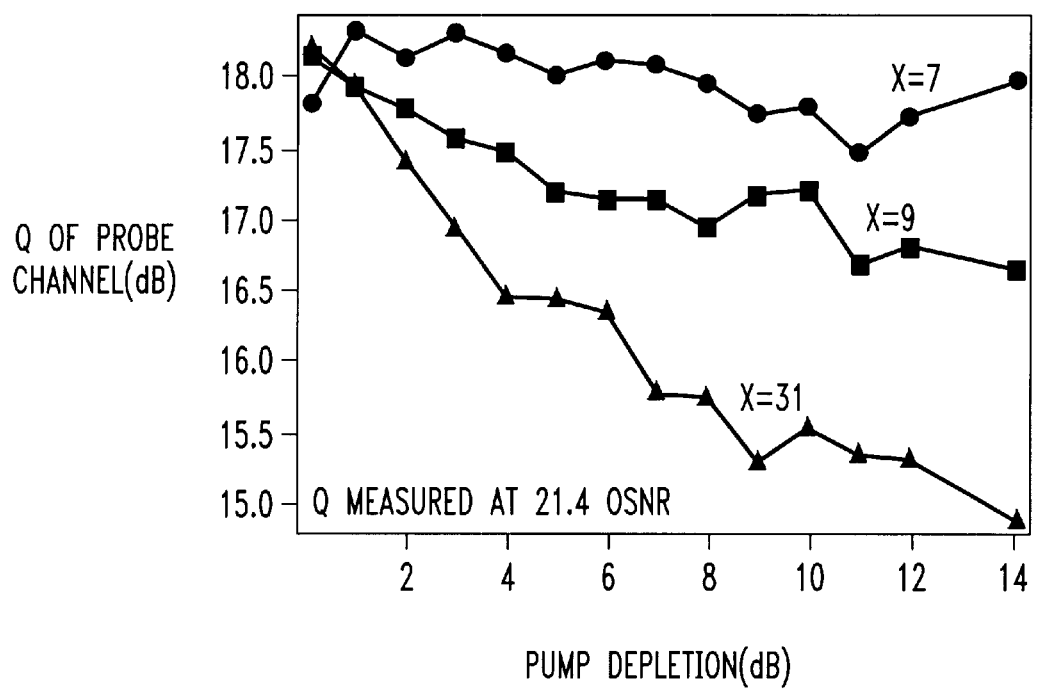
FIG. 10 plots the Q factor as a function of pump depletion for different data pattern lengths.

In the conventional test bed as illustrated in FIG. 4, the data stream is often a pseudo-random bit sequence. At a certain data rate (for example, 10 Gb/s), the frequency components in the crosstalk bandwidth will be different for different data lengths. FIG. 9 illustrates the relative RF power density as a function of the data pattern length, where the 16 signal channels were decorrelated above 100 MHz. When the depletion tones carry a $2^7-1$ PRBS pattern, the lowest frequency component is approximately 78 MHz. Therefore, the discrete components in a PRBS $2^7-1$ pattern has the least integrated RIN within the fiber crosstalk bandwidth. Even for the case where a $2^9-1$ PRBS pattern is used (where the lowest frequency component is approximately 19.6 MHz), the limited RF components within the fiber crosstalk bandwidth will substantially impact the integrated RIN value. However, for the $2^{31}-1$ PRBS case, the discrete RF components will have a spacing of only approximately 4.6 Hz, and the integrated RMN value will be a significant source of noise. FIG. 10 is a graph of the Q factor (i.e., SPS crosstalk penalty) as a function of pump depletion at different pattern lengths (i.e., 7, 9, 31) for 16 channels decorrelated above 100 MHz. It is shown that if a $2^7-1$ PRBS pattern is used (such as usually the case with "test" systems and computer simulations), the presence of SPS crosstalk will be completely missed. Therefore, when a real application is analyzed (which is similar as using a $2^{31}-1$ PRBS pattern), the problem of SPS crosstalk will appear. The recognition of the importance of the word length of the data pattern was heretofore unknown. This result, in accordance with the present invention, leads to three important conclusions: (1) the Q factor difference at $2^7-1$ and $2^{31}-1$ PRBS can be used in a system test bed to separate the SPS crosstalk penalty from other sources of noise penalty; (2) computer simulations using a $2^7-1$ PRBS may completely miss the SPS crosstalk penalty; and (3) if the data is encoded such that for any signal channel the ratio of the integrated RIN value within the fiber crosstalk bandwidth to the integrated RIN in the electrical bandwidth is small, the SPS crosstalk will be reduced.

Based on the recognition of these aspects of SPS crosstalk in a co-propagating fiber Raman amplifier, it is possible, in accordance with the teachings of the present invention, to use co-propagating fiber Raman amplifiers in an optical communication system, as long as the operating parameters are well understood and controlled.

Figure 11:
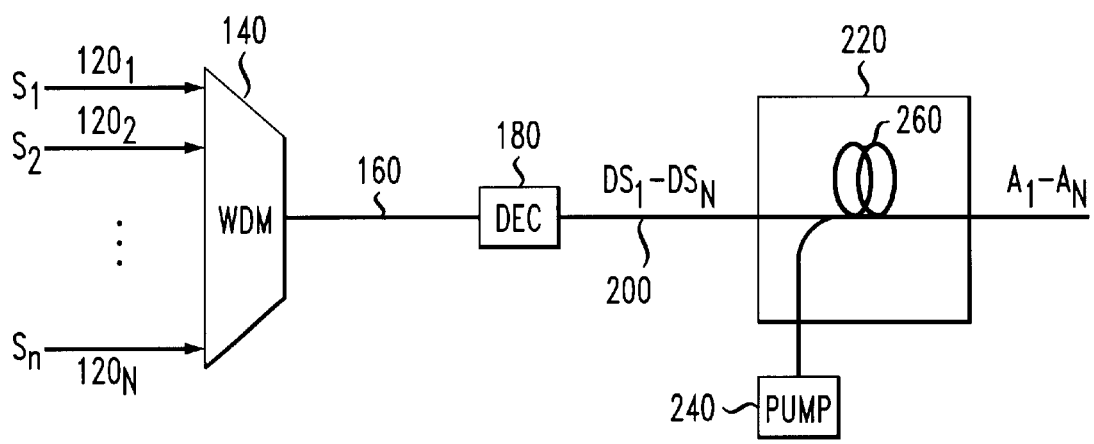
FIG. 11 illustrates an exemplary co-propagating system exhibiting reduced input signal correlation in accordance with the present invention.

In particular, FIG. 11 illustrates, in simplified block diagram form, an exemplary WDM optical transmission system 100 of the present invention that is configured to reduce signal-pump-signal (SPS) crosstalk in the amplifier region. As shown, a plurality of N separate input signals $S_1-S_N$ are applied as separate inputs along associated communication paths $120_1-S^N$ and then to a wavelength division multiplexer (WDM) 140. WDM 140 is a component well-known in the art and functions to combine the separate signals $S_1-S_N$ and coupled the signals onto a single output transmission fiber 160, as shown in FIG. 1. In accordance with one particular embodiment of the present invention, a decorrelator 180 is disposed along transmission fiber 160 and is used to introduce a predetermined randomization function between input signals $S_1-S_N$. Alternatively, system 100 may utilize a plurality of "dummy" channels with input signals $S_1-S_N$, or include a specific encoder to reduce IRIN to a predetermined amount within the fiber crosstalk bandwidth. Referring back to FIG. 11, the decorrelated signals, denoted $DS_1-DS_N$, thereafter propagate along fiber 200 and enter fiber Raman amplifier region 220. A pump source 240 is disposed as shown to couple a pump input (operating at a wavelength of, for example, 1435 nm) into fiber 260 with the decorrelated signals $DS_1-DS_N$ to provide a plurality of amplified signals $A_1-A_N$, with minimal SPS crosstalk at the output of co-pumped Raman amplifier 220.

Figure 12:
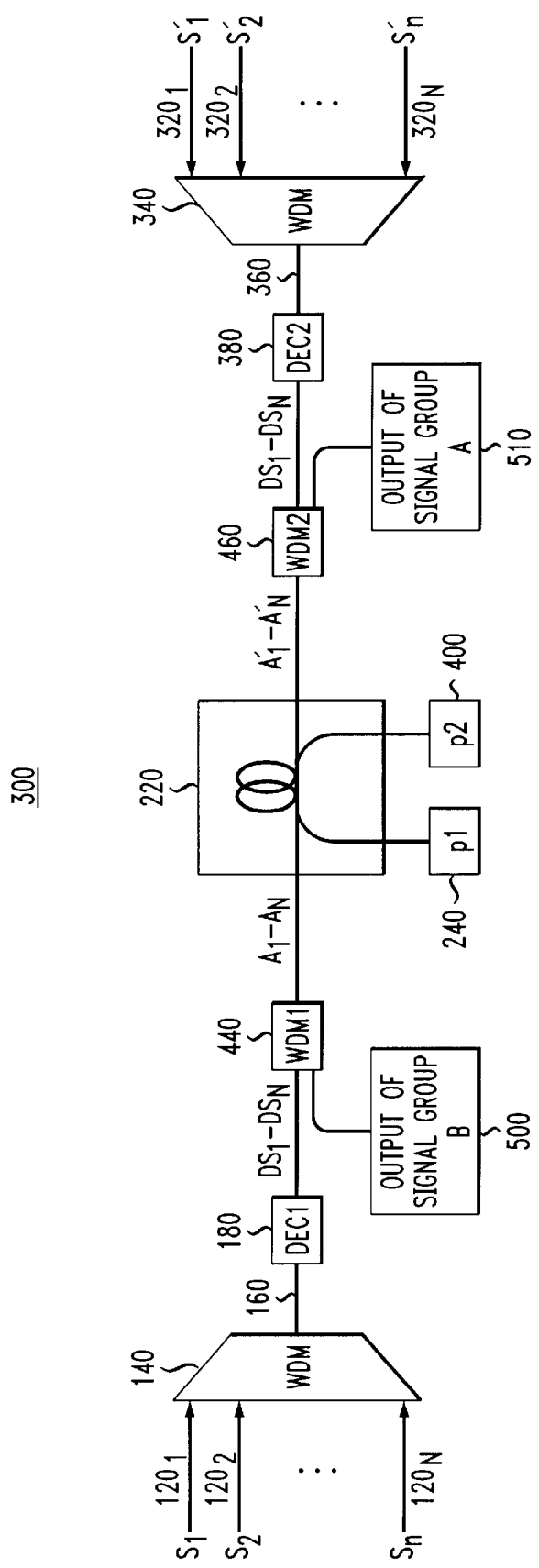
FIG. 12 illustrates an exemplary bi-directional co-propagating system with reduced signal-pump-signal crosstalk in accordance with the present invention.

A bi-directional WDM communication system 300 of the present invention is illustrated in FIG. 12. A number of the elements in system 300 are identical to those described above in association with system 100 of FIG. 11 and carry the same reference numeral. System 300 is considered "bi-directional" in the sense that a second plurality of input signals, denoted $S'_1-S'_N$ propagate along a second set of input signal paths 320 and are applied as inputs to a second WDM 340. This second plurality of input signals is then provided as an output along a single transmission path 360 and passes through a second decorrelator 380 (or otherwise modified using a plurality of dummy channels and/or specific encoding) to produce a set of decorrelated signals $DS'_1-DS'_N$. A second pump source 400 is included in system 300 of FIG. 12 and, as shown, produces a second pump signal $P_2$, where $P_2$ co-propagates with decorrelated signals $DS'_1-D'S_N$. Indeed, for bi-directional system 300 of FIG. 12, the existence of two separate pump signals (from sources 240 and 400), results in providing both co- and counter-propagating pumps for the information signals amplified within fiber Raman amplifier 220. Thus, it is important that the problems associated with SPS crosstalk be addressed in a bi-directional communication arrangement, since such a system will inevitably employ a co-propagating pump.

Referring to FIG. 12, a first pair of wavelength division multiplexers (WDM) 460, 440 are used to provide for the bi-directional transmission of information signals. In particular, the first plurality of input signals $S_1-S_N$ will exit WDM 140 and be directed as an input to first decorrelator 180. The plurality of decorrelated information signals $DS_1-DS_N$ subsequently pass through a WDM 440 and into fiber Raman amplifier 220.

At the output of fiber Raman amplifier 220, amplified signals $A_1-A_N$ enter WDM2 460 and are separated from the second plurality of signals. In a similar fashion, the second plurality of input signals $S'_1$–$S'_N$ will exit second WDM 340 and enter second decorrelator 380. The decorrelated plurality of signals $DS'_1$–$DS'_N$ will then pass through WDM2 460 and enter fiber Raman amplifier 220. At the output of fiber Raman amplifier 220, the second plurality of amplified signals, denoted $A'_1$–$A'_N$, will enter WDM 440. Amplified signals $A'_1$–$A'_N$ will then be separated from first plurality of signals.

Figure 13:
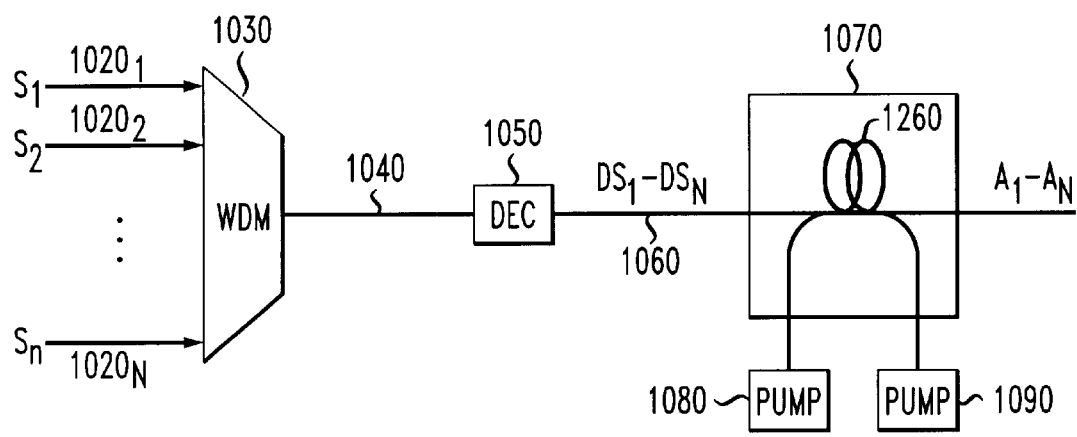
FIG. 13 illustrates an exemplary WDM optical transmission system configured to reduce SPS crosstalk in the fiber Raman amplifier, using a bi-directional pumping scheme.

FIG. 13 illustrates, in simplified block diagram form, an exemplary WDM optical transmission system 1000 of the present invention that is configured to reduce SPS crosstalk in the amplifier region using a bi-directional pumping scheme, where a pump signal 1080 is co-propagating with the input message signals and pump 1090 is counter-propagating with the input message signals. As shown, a plurality of N separate input signals $S_1$–$S_N$ are applied as separate inputs along associated communication paths $1020_1$–$1020_N$ and thereafter coupled as inputs into a WDM 1030. WDM 1030 is a component well-known in the art and functions to combine the separate signals $S_1$–$S_N$ and couple the combined signals onto a single output fiber 1040, as shown.

In accordance with the present invention, a decorrelator 1050 (or other arrangement, as discussed above, for adding "dummy channels" or signal encoding) is disposed along fiber 1040 and is used to reduce IRIN to a predetermined value. The decorrelated signals, denoted $DS_1$–$DS_N$, thereafter propagate along fiber 1060 and enter fiber Raman amplifier region 1070. A pump source 1080 is also disposed as shown to couple a pump (operating at a wavelength of, for example, 1435 nm) into fiber 1260 with decorrelated signals $DS_1$–$DS_N$ to provide a plurality of amplified signals $A_1$–$A_N$ with minimal SPS crosstalk at the output of Raman amplifier 1070.

Therefore, in accordance with the present invention, the capability of decorrelating the input signals within the fiber crosstalk bandwidth will greatly reduce the presence of SPS crosstalk. By also encoding the data to reduce the ratio of RIN within the fiber crosstalk bandwidth to that within the data electrical bandwidth, the SPS crosstalk will be further reduced. Lastly, if necessary, "dummy" channels can be added to increase the number of data channels present in any given system. The present invention is also applied to the discrete Raman amplifiers.

It is to be understood that various other modifications will be readily apparent to those skilled in the art without departing from the scope and spirit of the present invention as described above. Accordingly, it is not intended that the scope of the present invention be limited to the description set forth herein, but rather that the claims be construed as encompassing all of the features of patentable novelty that reside in the claims appended hereto, including all features that would be treated as equivalents thereof by those skilled in the art to which this invention pertains.

What is claimed is:

1. In an optical WDM transmission system, a fiber Raman amplifier for generating optical amplification in a plurality of N statistically independent input signals, said fiber Raman amplifier comprising at least one pump source disposed to provide a co-propagating pump in said fiber Raman amplifier with said plurality of N statistically independent input signals so as to provide optical amplification into the pump depletion region, wherein said plurality of N statistically independent input signals are decorrelated in the signal-pump-signal (SPS) crosstalk bandwidth to exhibit a reduced value for the integrated relative intensity noise of said plurality of N statistically independent input signals over said fiber crosstalk bandwidth, when compared with a plurality of N correlated signals.

2. An optical WDM transmission system as defined in claim 1 wherein the integrated relative intensity noise is defined as the integral over all frequencies of the relative intensity poise value of the plurality of N statistically independent input signals interacting with a Raman pump, and the associated crosstalk transfer function.

3. An optical WDM transmission system as defined in claim 1 wherein the fiber crosstalk bandwidth is defined as all frequencies below a predefined null in a transfer function curve associated with the crosstalk efficiency.

4. An optical WDM transmission system as defined in claim 3, wherein the fiber crosstalk bandwidth is defined as all frequencies below the second null in the transfer function curve.

5. An optical WDM transmission system as defined in claim 1 wherein the fiber crosstalk bandwidth is defined by the relation:

$$\omega = 3\pi/[L_e(1/v_p - 1/v_s)],$$

wherein $v_p$ the defines the group velocity at the pump wavelength, $v_s$ is the group velocity at the signal wavelength, and $L_e$, is the "effective length" of the amplification region.

6. An optical WDM transmission system as defined in claim 1 wherein the fiber crosstalk bandwidth is approximately 750 MHz.

7. An optical WDM transmission system as defined in claim 1 wherein the reduced value of the integrated relative intensity noise of the plurality of N statistically independent input signals is achieved by using a relatively large number of channels to reduce the integrated relative intensity noise.

8. An optical WDM transmission system as defined in claim 7, wherein a plurality of dummy channels are used in association with a plurality of message channels to provide a relatively large plurality of input channels.

9. An optical WDM transmission system as defined in claim 7, wherein a plurality of 5 dummy channels are used with a plurality of 5 message channels to reduce the SPS crosstalk.

10. An optical WDM transmission system as defined in claim 9, wherein a plurality of 5 dummy channels is used with the plurality of 5 message channels, at 5 dB pump depletion with 10 dB Raman gain, to reduce the SPS crosstalk to a value less than 1 dB.

11. An optical WDM transmission system as defined in claim 9, wherein a plurality of 15 dummy channels is used with the plurality of 5 message channels, at 5 dB pump depletion with 10 dB of Raman gain, to reduce the SPS crosstalk to a value less than 0.5 dB.

12. An optical WDM transmission system as defined in claim 9, wherein a plurality of 35 dummy channels is used with the plurality of 5 message channels, at 5 dB pump depletion with 10 dB of Raman gain, to reduce the SPS crosstalk to a value less than 0.2 dB.

13. An optical WDM transmission system as defined in claim 1 wherein the plurality of N statistically independent input signals are particularly encoded to reduce the integrated relative intensity noise value over the fiber crosstalk bandwidth.

14. An optical WDM transmission system as defined in claim 13 wherein the plurality of N input signals are particularly encoded such that for any signal channel, the ratio of the integrated relative intensity noise within the fiber crosstalk bandwidth divided by the crosstalk bandwidth to the integrated relative intensity noise over the entire electrical bandwidth divided by the entire electrical bandwidth of the data is relatively small.

15. An optical WDM transmission system as defined in claim 14 wherein the ratio is less than −3 dB.

16. An optical WDM transmission system as defined in claim 1 wherein the plurality of N statistically independent input signals are decorrelated to reduce the integrated relative intensity noise over the fiber crosstalk bandwidth.

17. An optical WDM transmission system as defined in claim 16 wherein the plurality of N input signals are decorrelated down to a frequency of at least 2 MHz.

18. An optical WDM transmission system as defined in claim 17 wherein the plurality of N input signals comprises a plurality of 10 signal channels, up to 5 dB pump depletion with 10 dB Raman gain, exhibiting a SPS crosstalk penalty of less than 1.0 dB.

19. An optical WDM transmission system as defined in claim 17, wherein the plurality of N input signals comprises a plurality of 20 signal channels, up to 5 dB pump depletion with 10 dB Raman gain, exhibiting a SPS crosstalk penalty of less than 0.5 dB.

20. An optical WDM transmission system as defined in claim 17 wherein the plurality of N input signals comprises a plurality of 40 signal channels, up to 5 dB pump depletion with 10 dB Raman gain, exhibiting a SPS crosstalk penalty of less than 0.1 dB.

21. In a bi-directional optical WDM transmission system, a fiber Raman amplifier for generating optical amplification in a first plurality of N input signals propagating in a first direction through the, fiber Raman amplifier and in a second plurality of N input signals propagating in a second, opposite direction through said fiber Raman amplifier, so as to provide optical amplification into the pump depletion region, wherein said first and second pluralities of N input signals are decorrelated in the signal-pump-signal (SPS) crosstalk bandwidth; and a first pump, co-propagating with respect to the first plurality of input signals propagating in said first direction and a second pump, co-propagating with respect to the second plurality of N input signals propagating in the second direction, wherein the second direction is opposite to the first direction.

22. A bidirectional optical WDM transmission system as defined in claim 21 wherein the at least one pump source comprises a pump source disposed to be co-propagating with the first plurality of N input signals and counter-propagating with the second plurality of N input signals.

23. A bi-directional optical WDM transmission system as defined in claim 21, wherein the at least one pump source comprises a pump source disposed to be co-propagating with the second plurality of N input signals and counter-propagating with the first plurality of N input signals.

24. A bi-directional optical WDM transmission system as defined in claim 21 wherein the at least one pump source comprises a first pump source disposed to be co-propagating with the first plurality of N input signals and a second pump source disposed to be co-propagating with the second plurality of N input signals.

25. A bi-directional optical WDM transmission system as defined in claim 21 wherein the first and second pluralities of N input signals are statistically independent to exhibit a reduced value for the integrated relative intensity noise of said first and second pluralities of N input signals over the fiber crosstalk bandwidth, when compared with a plurality of N correlated signals.

26. A bi-directional optical WDM transmission system as defined in claim 25 wherein the integrated relative intensity noise is defined as the collective modulation of the first plurality of N input signals as they interact with the depleted pump in the fiber Raman amplifier.

27. A bidirectional optical WDM transmission system as defined in claim 21 wherein the reduced value of the integrated relative intensity noise of said first and second pluralities of N input signals is achieved by using a relatively large number of channels to reduce the integrated relative intensity noise.

28. A bidirectional optical WDM transmission system as defined in claim 27 wherein a plurality of dummy channels are used in association with the plurality of message channels to provide a relatively large plurality of input channels.

29. A bi-directional optical WDM transmission system as defined in claim 27 wherein the first and second pluralities of N input signals are particularly encoded to reduce the integrated relative intensity noise value over the fiber crosstalk bandwidth.

30. An optical WDM transmission system as defined in claim 27 wherein the first and second pluralities of N input signals are particularly encoded such that for any signal channel, the ratio of the integrated relative intensity noise within the fiber crosstalk bandwidth divided by the crosstalk bandwidth to the integrated relative intensity noise over the entire electrical bandwidth divided by the entire electrical bandwidth of the data is relatively small.

* * * * *